United States Patent
Yeh et al.

(10) Patent No.: US 6,215,478 B1
(45) Date of Patent: Apr. 10, 2001

(54) HIGH RESOLUTION FINGER INPUT CONTROLLING DEVICE IN AN ARBITRARILY DEFINED RANGE

(76) Inventors: Fu-Kuo Yeh; Mei-Yun Chen, both of 3F, No. 2, Lane 42, Hou-Kang St., Shih-Lin Dist. Taipei (TW)

( * ) Notice: Subject to any disclaimer, the term of this patent is extended or adjusted under 35 U.S.C. 154(b) by 0 days.

(21) Appl. No.: 08/979,808

(22) Filed: Nov. 26, 1997

(51) Int. Cl.[7] .................................................. G09G 5/00
(52) U.S. Cl. ........................................... 345/173; 345/163
(58) Field of Search .................................... 345/173, 163, 345/127, 128, 66, 157, 161, 168; 364/190, 188; 340/706

(56) References Cited

U.S. PATENT DOCUMENTS

| | | | |
|---|---|---|---|
| 4,202,041 | * 5/1980 | Kaplow et al. | 364/900 |
| 4,782,327 | * 11/1988 | Kley et al. | 340/365 P |
| 4,935,728 | * 6/1990 | Kley | 340/709 |
| 5,300,927 | * 4/1994 | Arai et al. | 345/157 |
| 5,422,674 | * 6/1995 | Hooper et al. | 348/409 |
| 5,428,355 | * 6/1995 | Jondrow et al. | 341/20 |
| 5,553,296 | * 9/1996 | Forrest et al. | 395/750 |
| 5,570,111 | * 10/1996 | Barrett et al. | 345/157 |
| 5,704,037 | * 12/1997 | Chen | 345/184 |
| 5,801,941 | * 9/1998 | Bertram | 364/188 |
| 5,808,603 | * 9/1998 | Chen | 345/157 |
| 5,825,308 | * 10/1998 | Rosenberg | 341/20 |
| 5,880,411 | * 3/1999 | Gillespie et al. | 178/18.01 |
| 6,011,546 | * 1/2000 | Bertram | 345/327 |

* cited by examiner

Primary Examiner—Vijay Shankar
Assistant Examiner—Vanel Frenel
(74) Attorney, Agent, or Firm—Bacon & Thomas, PLLC

(57) ABSTRACT

The present invention discloses a high resolution finger controlling input device in an arbitrarily defined range which comprises a finger controlling element having a plurality of thin layered sensing surface, which when closely scribed, can produce 0 and 1 binary signals of displacement; and a formative positioning unit, capable of producing 0 and 1 signals in any defined range divided by the coordinate axes so that the cursor may correspondingly acquire the effective displacement and positioning in absolute coordinate mode. The finger controlling element may be formed with a touch input board with a input medium thereon. The input medium has a stopping end provided on touch input board in a short distance. The stopping end is formed into a rod or on end thereof is formed into a top pin for touching with finger to transmit finger force or human static electric charges, so that the cursor may stably perform fine displacement to correspond to each point on the display at any degree of resolution while the input medium is working at the limited region on the touch input board. The device of the present invention is a convenient, stable, precisely working and compact sized saving cost product.

2 Claims, 19 Drawing Sheets

HIGH RESOLUTION FINGER INPUT CONTROLLING DEVICE IN AN ARBITRARILY DEFINED RANGE

BACKGROUND OF THE INVENTION

1. Field of the Invention

The present invention relates to an improved finger controlling input device, and more particularly to a novel finger controlling input device comprising a finger controlling input board which can be operated to move a cursor along the absolute coordinate system in an arbitrarily defined range with any resolution.

2. Description of the Prior Art

A conventional computer mouse is disadvantageous that it is difficult to assemble and simplify due to its complicated composition elements. In addition, the sensible minimum distance by hand driving makes its dimension being unable to be minimized effectively so that the production cost can not be reduce correspondingly. Among those hand controlling devices, a finger controlling input device can act as a general mouse, it may has an additional function of hand writing in case it is properly designed. It is the reason why the latter has a prospective future and more particularly, through a long term improvement ,the product has been made so thin that it has become able to replace the trace ball in the present portable computer. A conventional touch input board includes electromagnetic type, contact resistance type, and capacitance type, among which the contact resistance type and capacitance type are mostly use in the portable computer. The capacitance type is mainly formed of multiple lamination provided a conductive grid plate beneath the anti-frictional sheet. By moving a finer on the anti-frictional sheet the magnetic field on the conductive grid plate is varied by the static electric charge on the human body, moreover, the moving direction of the finger is detected and converted to (0,1) binary signals, and corresponding cursor moving direction is also controlled. No matter it is utilized as an additional input device for a computer system or an fundamental equipment for a portable computer, it is impossible to make sophisticated displacement by means of controlling input board only. However, there are several problems remained to be solved with regard to this device as mentioned below:

1. The touch input board may not be made satisfactorily small as its cursor has to be removed by a human finger.
2. Individually different touching pressure and conductivity of the operator results in unstable movement of the cursor.
3. Limited number of sensing elements with respect to entire area of display screen makes each sensing element to be responsible for quite a number of pixels on the display screen results in inaccurate flopping of the cursor. Unless the number of sensing elements is increased to match the desired resolution of the display screen, such a problem can not be solved. But increasing of the sensing elements again entails the enlargement of the area of a touch controlling board which leads to significant increase of the manufacturing cost.

In conclusion, the above described problems limits the future aspect of the conventional devices. This initiated the motive for the inventor of the present invention to develop a finger controlling input device of better properties, more efficient and more saving cost.

SUMMARY OF THE INVENTION

It is a first object of the present invention to provide a novel finger controlling input device which, by accurately removing the cursor along the absolute coordinate in an arbitrarily defined region to obtain any desired degree of display resolution.

It is a second object of the present invention to provide a novel finger controlling input device, which can be easily operated by hand, compact, with better practicality, easily manufacturable with low cost.

To achieve the above and other objects, a high resolution finger controlling input device in an arbitrarily defined range comprises a finger controlling element having a plurality of thin layered sensing surface, which when closely scribed, can produce 0 and 1 binary signals of displacement; and a formative positioning unit, capable of producing 0 and 1 signals in any defined range divided by the coordinate axes, where in amount of total signals 0, 1 in each axis are divided into a plurality of different speed regions CN, wherein C1 represents a low speed region, CN represent higher speed region, let each speed region correspond to each different displacement multiple rate $k1, k2 \ldots KN$ respectively, and then sum up the products of $C1, C2 \ldots CN$ to each corresponding displacement multiple rate $K1, K2 \ldots KN$ to obtain total corresponding display resolution, i.e., to obtain a value equal to or larger than display resolution. At least two recorders are installed for each axis to record traveling lattice numbers of $C1, C2 \ldots CN$. The sum of the data in two recorders is C. At least 2 is added to the speed corresponding to the speed C2 which is higher than a low speed, while the result of the other recorder is subtracted by 1 keeping total displacement to be 1. By such way of recording movement, the sensing surface of a finger controlling element may be cut to form a input range corresponding to entire display resolution, which enables the finger controlling element can make low speed point-to-point fine displacement within the region, while in high speed movement, it can make axis accelerated displacement and the motion of returning to the original point such that the cursor may be controlled effective with respect to each point on the display.

Furthermore, the finger controlling element may be formed with a touch input board with an input medium thereon such that when the input medium is moving on the touch input board, the cursor may effectively perform displacement and positioning by the absolute coordinate working mode. The touch controlling input board may be resistance type or capacitance type, and the input medium has a stopping end closely provided on the touch controlling input board, and the stopping end may be formed by a stud or a top pin with a flat plate provided at one end for finger touching so that the finger pressure and the static electric charge on the human body may be transmitted to actuate the cursor to move stably among the lattices with the specifically defined region with respect to each corresponding point on the display. Such an effective design feature greatly reduces the production cost and dimension of the finger controlling element, and moreover, makes the control of cursor more reliable and convenient.

One thing worthy of mention is that the formative positioning unit according to the present invention is a absolute coordinate positioning system with unlimited resolution which is the essence of a long term study of the inventor of the present invention. The technical principle can be coordinated with the circular optic grid piece which has been applied to USPTO by the title "CURSOR CONTROLLING DEVICE AND THE METHOD OF THE SAME" by applicants of Fu-Kuo YEH et al of U.S. Ser. No. 08/908098. Since the technology involved in it is so lengthly that is inconvenient to be fully re-explained or described herein. Therefore, in the specification of the present invention only enumerated its detailed flow charts in FIGS. 16A to 16I and attached tables 1 to 3. In this system the different moving velocity Vx is used to control the cursor with finger controlling element to displace in different distances on the display within limited moving region. The above described method is practically performed by dividing the cursor's moving space in several equal portions C=C1+C2+ . . . wherein C1, C2 represent displacement lattices (or distance) which belong to finger controlling element in each different speed zones V1, V2 respectively, and assume each different speed V1, V2 is corresponding to each different displacement ratio constant K1,K2 . . . Accordingly, it is possible to make (K1×C1)+(K2×C2)+ . . . =distance of display. Example: In an arbitrarily defined range of movable distance on a defined hardware=196 lattices×0.08 mm/lattice=15.68 mm X axis resolution corresponding to display=640
640=(1×C1)+(4×C2) K1=1, K2=4
196=C1+C2 ∴C2=148, C1=48;

This shows a hardware only in a limited region of 15.68 mm can be designed to provide 48 lattices of 1 to 1 fine displacement and 148 lattices of 1 to 4 coarse displacement corresponding to 640 of X-axis resolution. Again, assuming X-axis resolution on display is raised to 1024, then

1024=(1×C1)+(7×C2)K1=1, K2=7
196=C1+C2

It gives C2=138, C1=58; (The above analysis is made only for X-axis as an example, however, the same principles and procedures may be applied to Y-axis.)

In spite of the display resolution is increased from 640 to 1024, the pixel to pixel distance is shortened, consequently, the increase of K2 from 4 to 7 will not affect the cursor to move stably on the display. No matter how the display resolution changes, the relation K1=1 constantly exists. Thus when under low speed V1, the cursor is always able to perform fine displacement from pixel to pixel. In addition, there are provided two recorders respectively at the positive and negative directions of the unit for calculating the remaining lattice numbers C1 and C2 when the unit is operating. As the positive and the negative direction are corresponding with respect to each other, so that the finger controlling element may reliably return to its original point in the operating region, and relatively, it also makes the cursor on the display to return to its original point reliably. This enables the unit to operate properly under different resolution condition with tight angle coordinate mode. The main feature of this operation mode lies in that the calculation is made based on the formulas, a method of adding 2 to the sum of the recorders C2 . . . CN of high speed regions, and subtracting 1 from the recorder C1 of the low speed region, and keeping the sum of the data in all the recorders increasing by 1 which makes it possible to count high speed displacement and, at the same time, returns the data in the C1 recorder to zero without affecting the entire calculation, i.e., the data in the C1 recorder approaches an intermediate value. All the data may be collected by the firmware in the unit, and then transmit to a driver program in the finger controlling unit for treatment, so that as soon as the hand operated movement is switched from high speed to low speed, the surroundings of the fixed position where the cursor has reached will remain sufficient positions for fine displacement since those positions have returned to zero. The result will be similar that the cursor is surrounded by fine displaceable positions moving with the cursor on the display such that the cursor's displacement can be controlled within a limited hardware distance in absolute coordinate mode, and also can be precisely corresponded to each point on the display. It is the formative positioning unit that enables the device for the present invention to perform the cursor's displacement and precise positioning within a limited moving regions by absolute coordinate mode.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
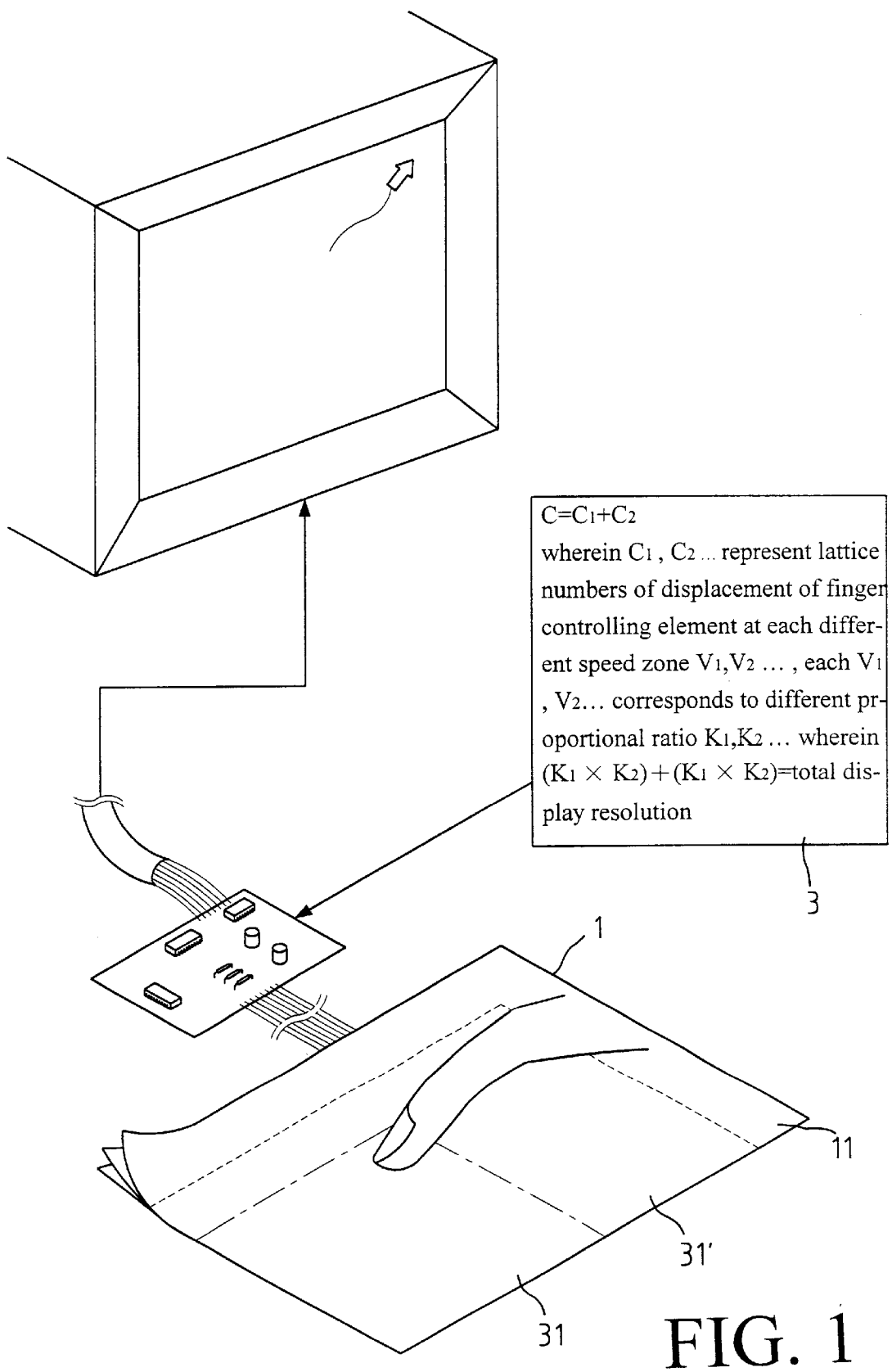
FIG. 1 is a schematic view showing the finger controlling element of the present invention which is dividable to a plurality of regions controllable by absolute coordinate mode and positioning.

As shown in FIG. 1, a high resolution finger controlling input device on an arbitrarily defined range can control the displacement and positioning of the cursor on a computer display by means of a control circuit, the device comprises a finger controlling element 1 having a plurality of thin layered sensing surface 11, which when closely scribed, can produce 0 and 1 binary signals of displacement; and A formative positioning unit 3, capable of producing 0 and 1 signals in any defined range 31 divided by the coordinate axes, so that the cursor may correspondingly acquire the effect of displacement and positioning in absolute coordinate mode. The amount of total signals of 0, 1 in each axis are divided into a plurality of different speed regions CN, wherein C1 represents a low speed region, C2 . . . CN represent higher speed regions. Let each speed region correspond o each different displacement multiple rate K1, K2 . . . KN respectively, and then sum up the product of C1,C2 . . . CN with each corresponding displacement multiple rate K1, K2 . . . KN to obtain total corresponding display resolution, i.e., to obtain a value equal to or larger than display resolution. At least two recorders are installed for each axis to record travelling lattice numbers above C1 and C2. The sum of the data in two recorders is C. At least 2 is added to the speed corresponding to the speed C2 which is higher than a low speed, while the result of the other recorder is subtracted by 1 such that keeping total displacement to be 1.

By such way of recording movement, the sensing surface 11 of the finger controlling element 1 may be scribed to form a input range 31 corresponding to entire display resolution, which enables the finger controlling element 1 can make low speed point-to-point fine displacement within the region 31, while in high speed movement, it can make an accelerated displacement and the returning motion the original point such that the cursor may be controlled effectively with respect to each point on the display. There is a specific feature of the present invention that its formative positioning unit 3 may perfectly coordinate with the finger controlling unit 1 regarding elasticity adjustment. However, the user may define at any position on the sensing surface 11 of the finger controlling element 1 a respective region 31 or 31' . . . etc. In spite of its dimension, when moving closely in it, the cursor may acquire equally fine control for performing point-to-point or rapid removing, and the cursor never flop as that is always experienced in a conventional device. The operation is so smooth and precise that the performance is for beyond the reach of any conventional device which is served presently.

Figure 2:
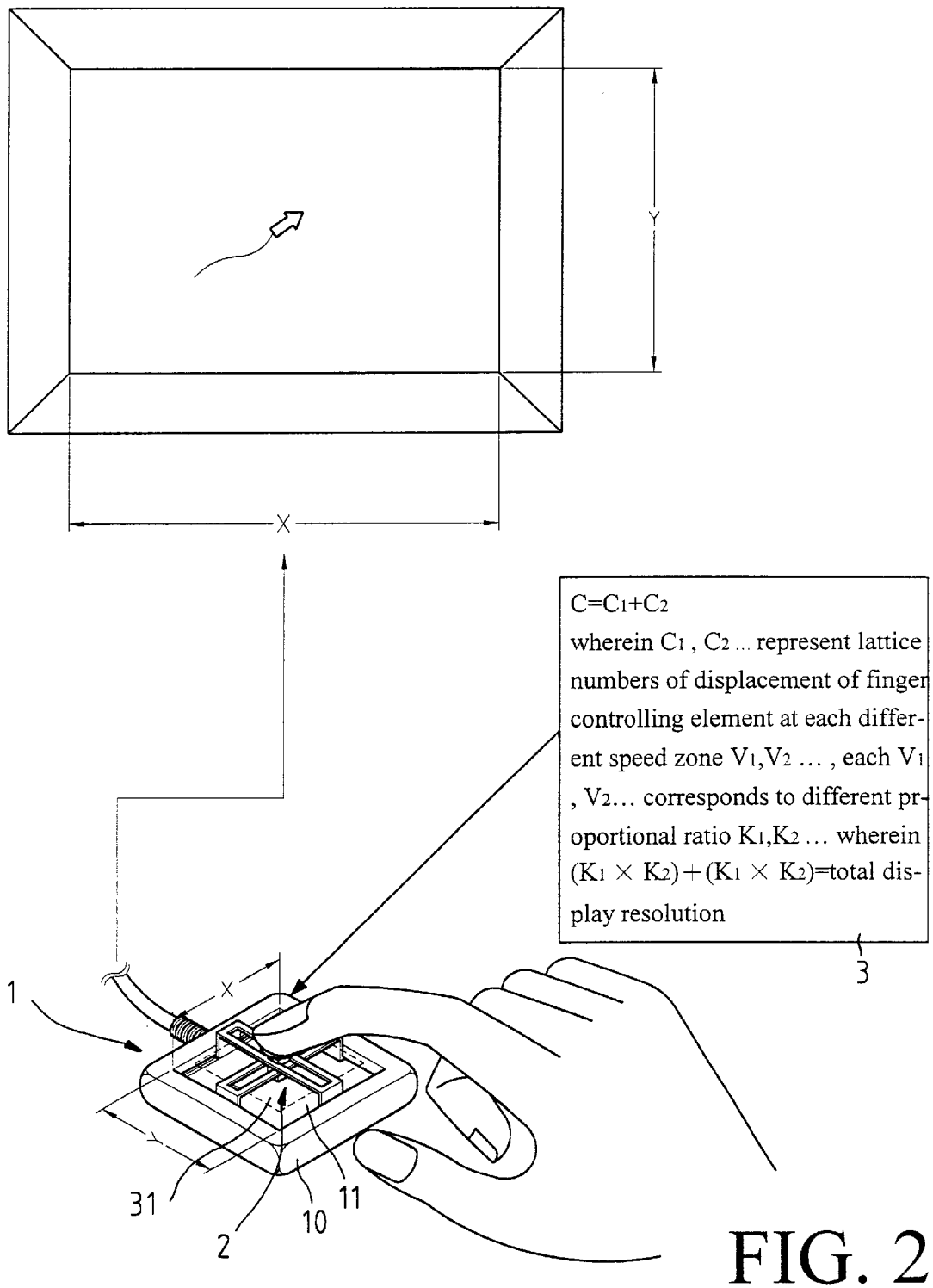
FIG. 2 is a schematic view showing the limited moving regions in the hardware of the present invention controllable by absolute coordinate mode and positioning.

As shown in FIG. 2, the finger controlling element 1 further comprises directly a touch input board 10 having defined small range 31, with an input medium 2 thereon so that electrically connects the touch input board 10 and the human hand. The input medium 2 at least has a stopping end 21 for approaching said sensing surface 11 of the touch input board 10. Further, by means of said formative positioning unit 3, when input medium 2 is moving on the touch input board 10, the cursor may effectively perform displacement and positioning in absolute coordinate working mode.

The touch input board 10 may be resistance type or capacitance type, for definite numbers of sensing division may be made within the limited region 31 for producing sufficient lattices to meet the operational requirement of the present invention. Let the transverse and the longitudinal moving distances for the input medium 2 be X and Y respectively, these values may be correspondingly displayed as the lengths in X axis and Y axis on the display screen, and sufficient ability of fine displacement positioning are maintained around the surrounding of moving cursor so that the moving distances may perfectly and precisely correspond to each point on the display.

Figure 3:
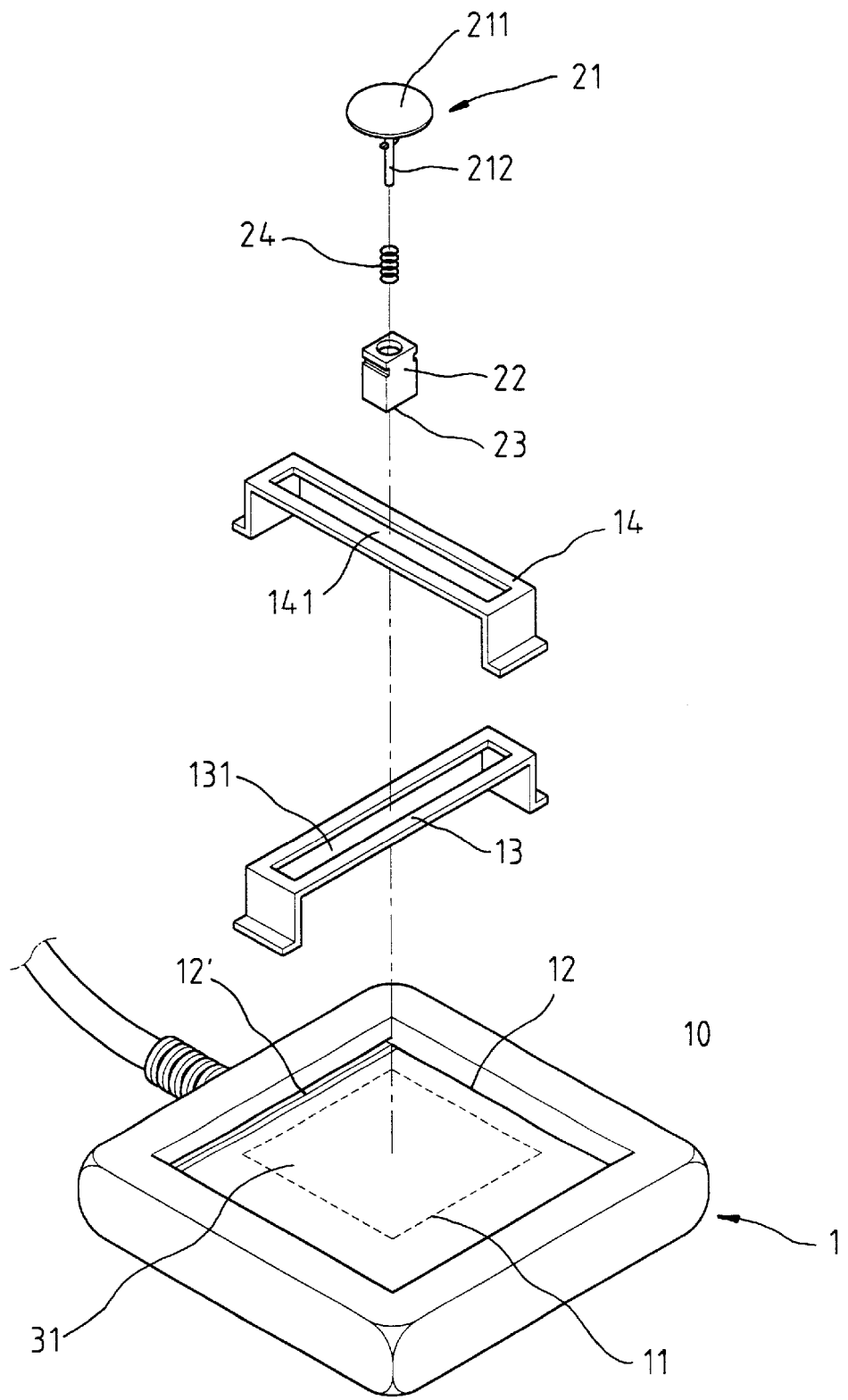
FIG. 3 is an exploded view of the finger controlling input device in a first embodiment according to the present invention.
Figure 4:
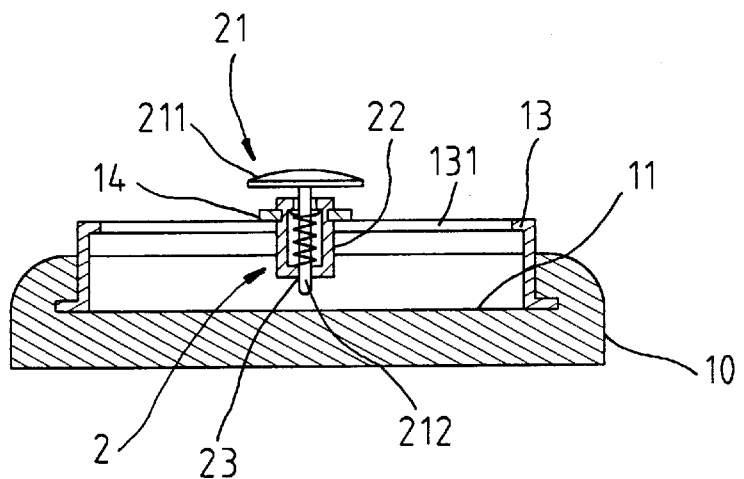
FIG. 4 is an assembled view of the finger controlling input device in a first embodiment according to the present invention.

As shown in FIGS. 3 and 4 showing the exploded and assembled views of the finger controlling input device in a first embodiment of the present invention respectively where in the touch input board 10 is provided with slot rails 12,12' for disposing two polar axes 13,14 thereon to correspond respectively to X axis and Y axis, whereon through long holes 131, 141 are provided. The intersecting position 15 of the two axis is for filling the input medium 2. The input medium 2 has a depressed chamber 22 with a penetrating hole 23 formed at its center. The stopping end 21 penetrates through one end of the input medium 2 and reaches the other end. The stopping end 21 is formed of an electrically conductive T shaped top pin with one end formed in sheet like touch plate 211 for finger pressing, while the other end is formed into a short needle 212 penetrating the above described penetrating hole 23. In the short needle 212 and depressed chamber 22, there is installed a support spring 24 for supplying the stopping end 21 with necessary restoring force after being pressed.

Figure 5:
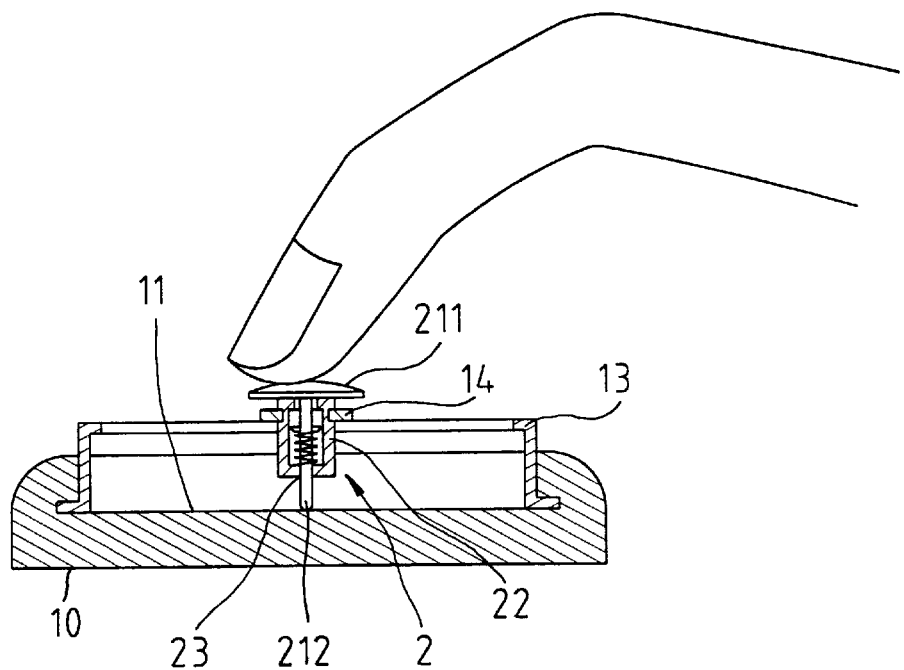
FIG. 5 shows the operational view of the finger controlling input device in a first embodiment according to the present invention.

As shown in FIG. 5, the input medium 2 may be supported by polar axes 13,14 . The finger is placed on the touch board 211 and the stopping end 21 is pressed downward and makes the short needle 212 to approach touch controlling input board 1 and move around within limited range 31 on the sensing surface 11. By means of formative positioning working unit 3, the cursor may at all times stably make fine displacement and correspond to each point on the display at any degree of resolution.

Figure 6:
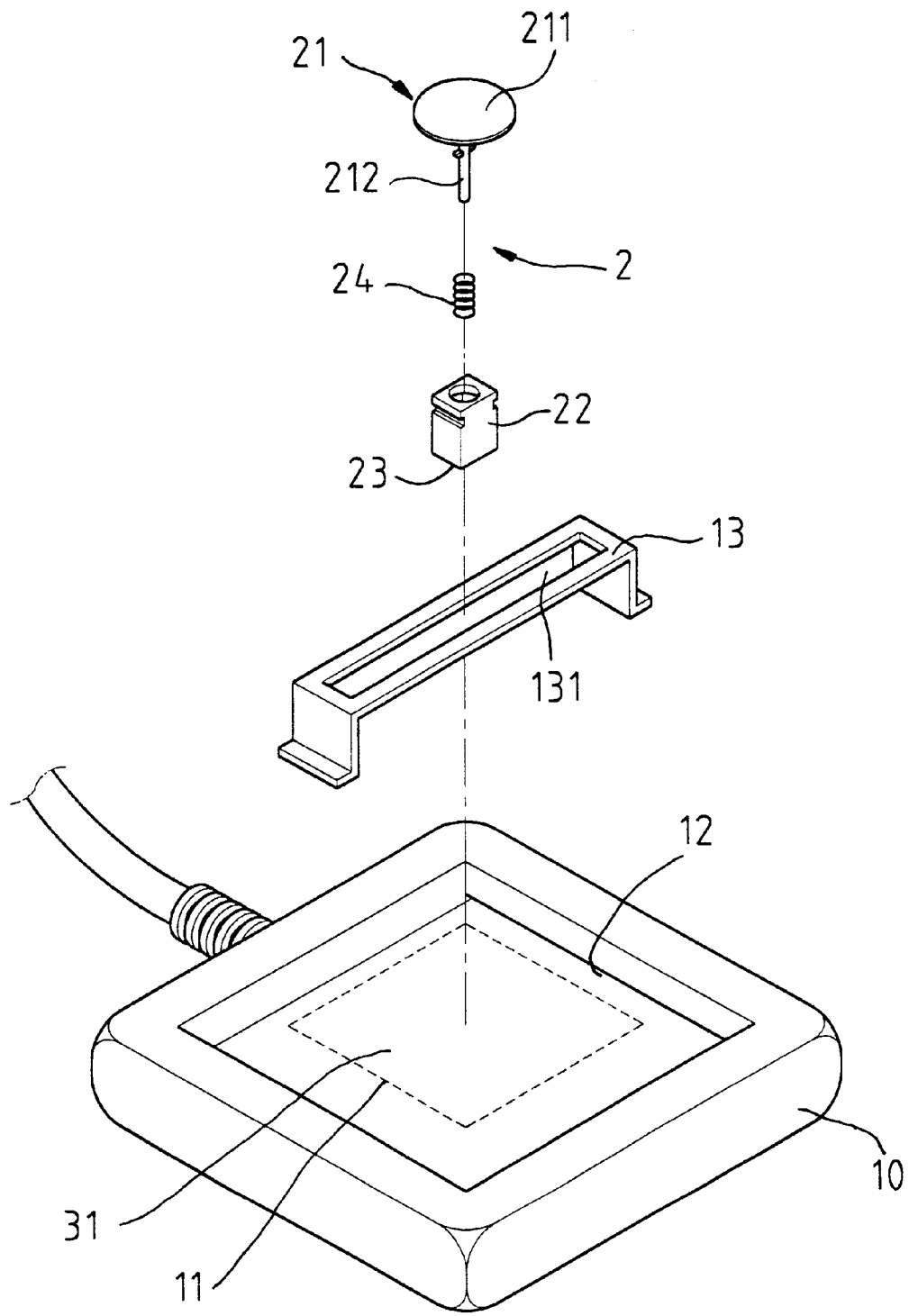
FIG. 6 is an exploded view of the finger controlling input device in a second embodiment of the present invention.
Figure 7:
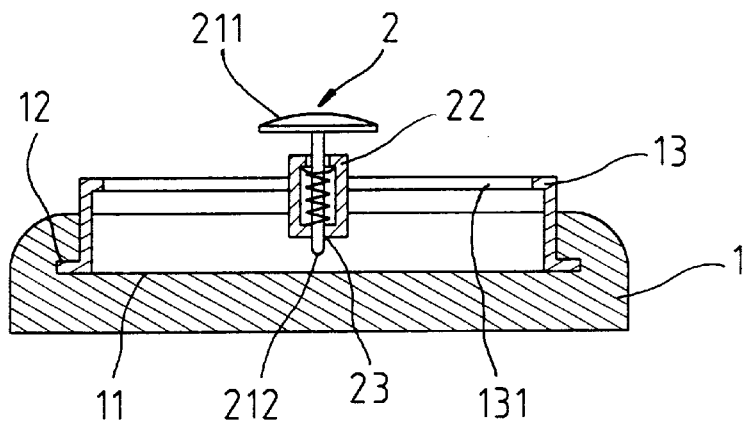
FIG. 7 is an assembled view of the finger controlling input device in a second embodiment of the present invention.
Figure 8:
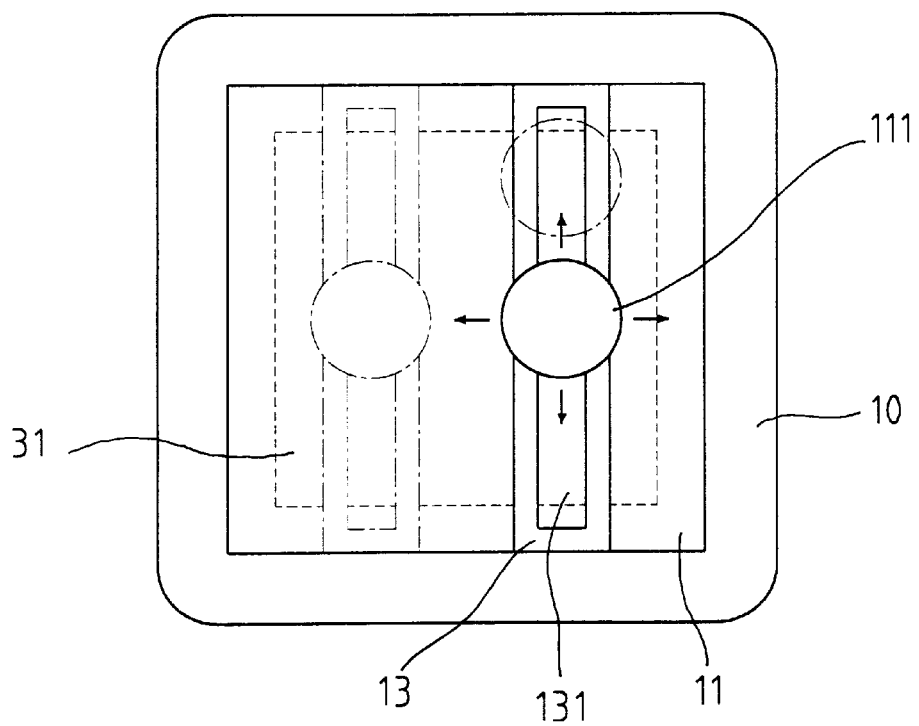
FIG. 8 is a plane view showing principle of displacement of the finger controlling input device in a second embodiment according to the present invention.

As shown in FIGS. 6,7 and 8, wherein the touch controlling input board 10 may only have the slot rail 12 at two opposing sides for disposing single polar axis 13 which has a through long hole 131 for installing the depressed chamber 22 on the input medium 2. Still by, the same principle of using formative positioning working unit 3, the input medium 2, being pressed by single polar axis 13, may act in the limited region 31, and make the cursor to displace stable and finely corresponding to each point on the display.

Figure 9:
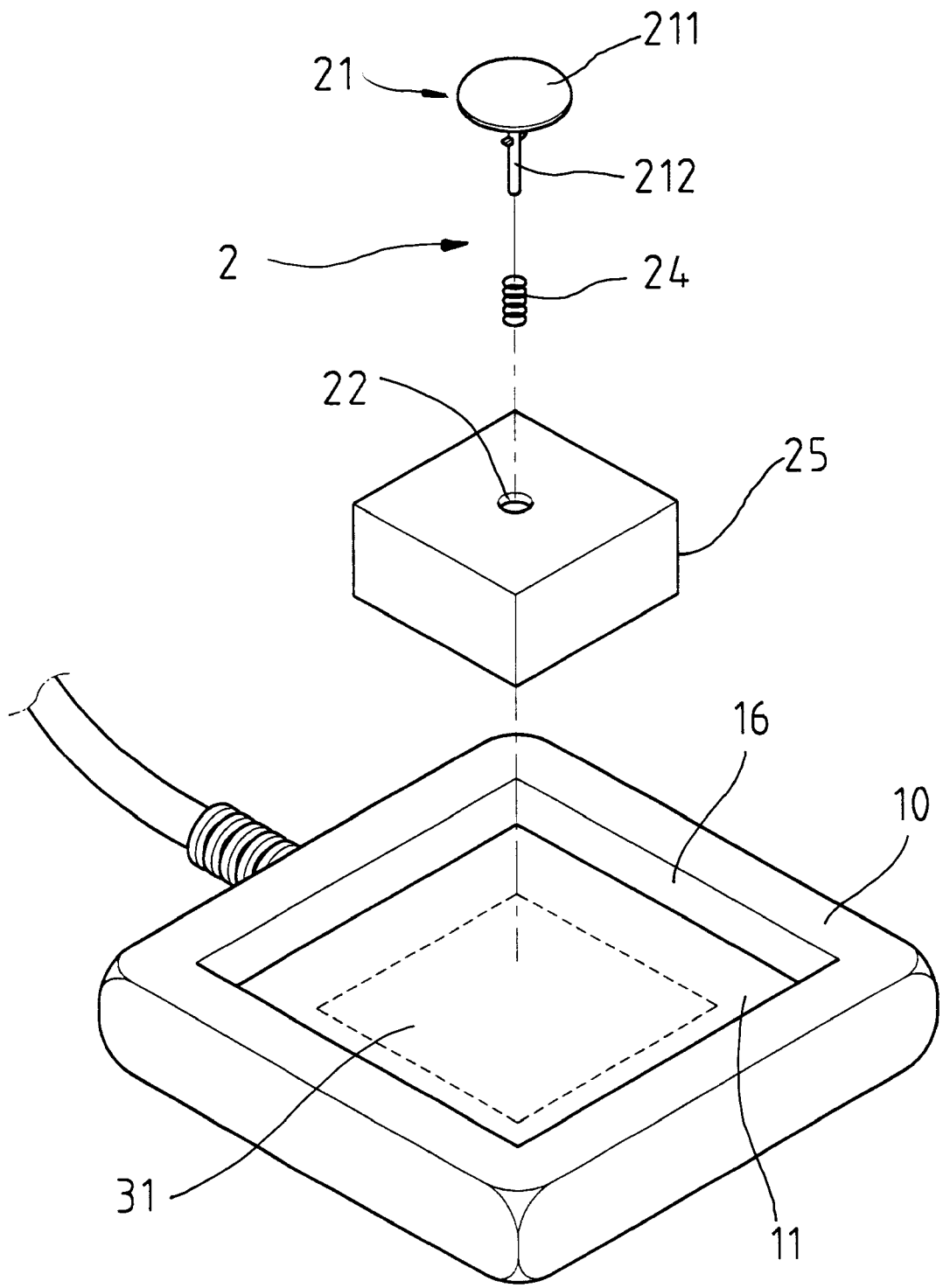
FIG. 9 is an exploded view of the finger controlling input device in a third embodiment of the present invention.
Figure 10:
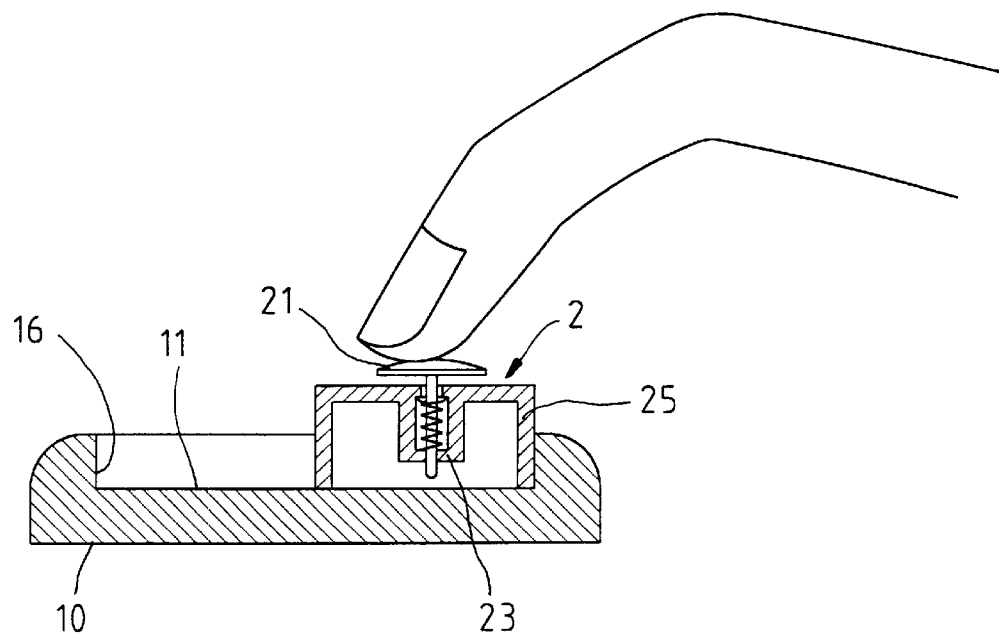
FIG. 10 is a plane view showing principle of displacement of the finger controlling input device in a third embodiment according to the present invention.

As shown in FIGS. 9 and 10, wherein limit frames 16,25 are provided on the touch input board 10 and the input medium 2 respectively. There is a depressed chamber 22 provided at the central portion of the limit frame 25, and a penetration hole 23 in the depressed chamber 22 is for stopping end 21 to pass through from one end to the other end of the input medium 2. The stopping end 21 is also a electrically conductive T shaped top pin with a sheet like touch board 211 provided at one end for pressing, while its other end is formed into a short needle 212 penetrating through the penetrating hole 23. However, there is a support spring 24 installed between the short needle 212 and depressed chamber 22 to supply restoring force for stopping end 21. The two limit frames 16 and 25 are of different sizes and arranges in opposingly jointed configuration with a clearance therebetween to confine the moving of stopping end 21. Similarly, by means of formative positioning working unit 3, the cursor may at all times stably make fine displacement and correspond to each point on the display at any degree of resolution.

Figure 12:
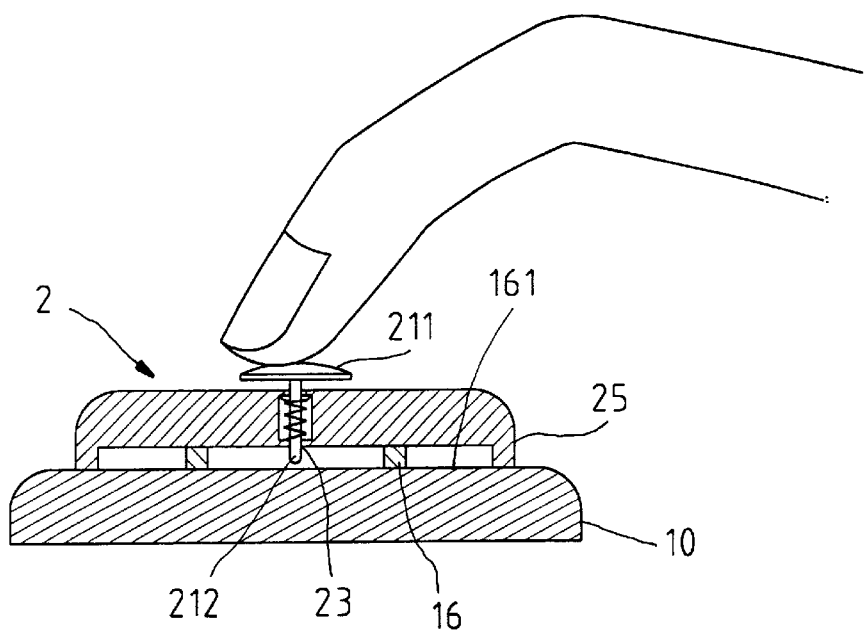
FIG. 12 is a plane view showing principle of displacement of the finger controlling input device in a fourth embodiment of the present invention.
Figure 11:
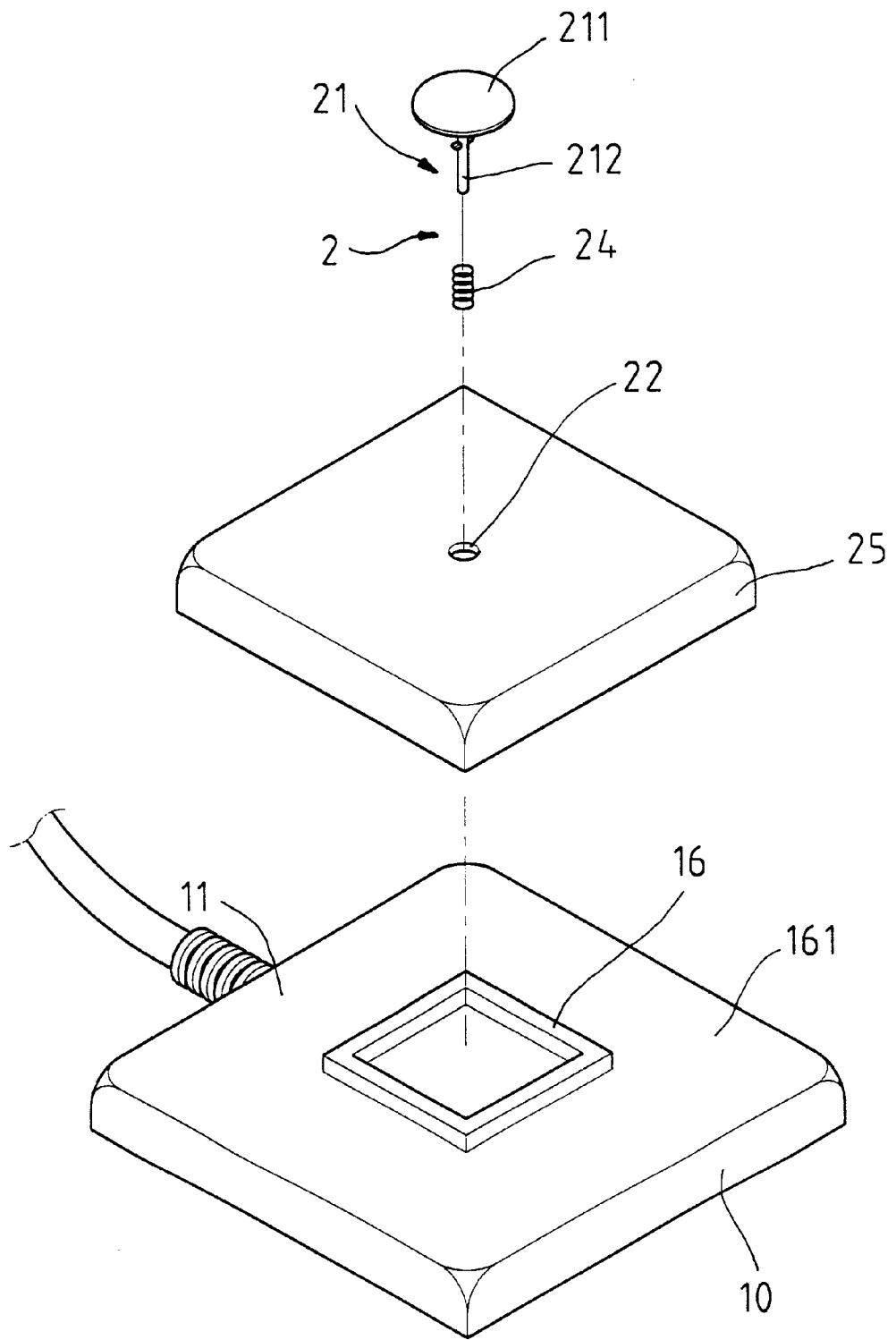
FIG. 11 is an exploded view of the finger controlling input device in a fourth embodiment of the present invention.

As shown in FIGS. 11 and 12, wherein sizes of limit frames 16, 25 may be different. A relatively large edge section 161 is formed around the limit frame 16 such that when two limit frames 16, 25 are opposingly faced, the stopping end 21 may move within the limited region 31 in the limit frame 16.

Figure 13:
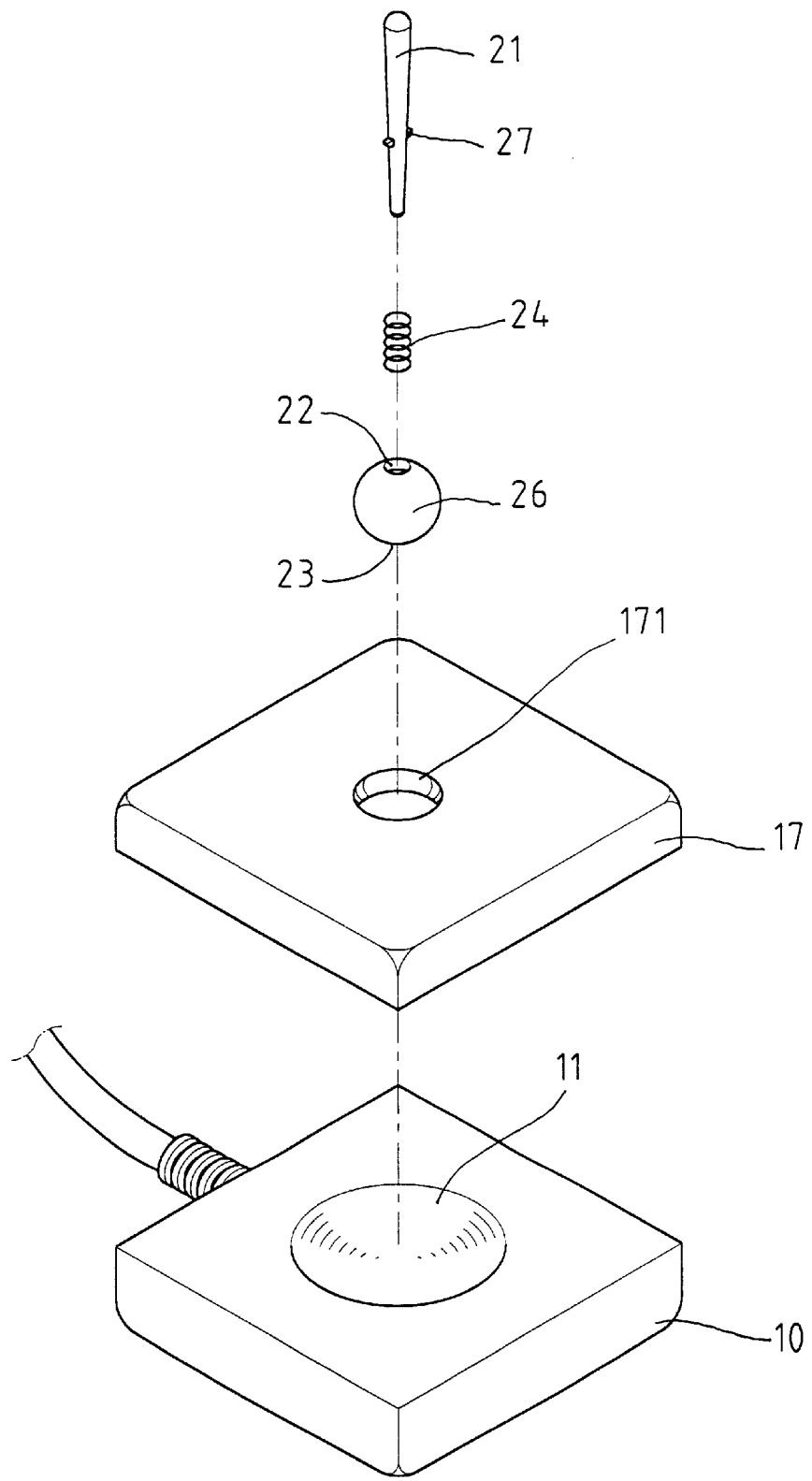
FIG. 13 is an exploded view of the finger controlling input device in a fifth embodiment of the present invention.
Figure 14:
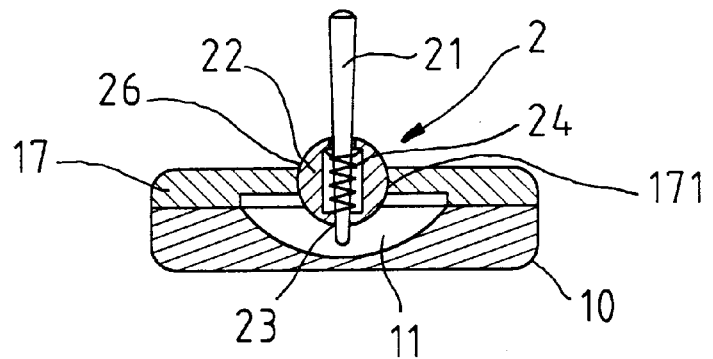
FIG. 14 is an assembled cross sectional view of the finger controlling input device in a fifth embodiment of the present invention.

As shown in FIGS. 13 and 14, the sensing surface 11 on the touch input board 10 is in concave arc shape. A spacer plate 17 having a circular through hole 171 at it central portion is provided on the touch input board 10. A ball 26 is provided for the input medium 2 to face opposingly the concave arc surface of said through hole 171. A depressed chamber 22 provided in the ball 26 has a penetrating hole 23 for the stopping end 21 to pass through. A rod for a stopping ring 27 is provided for the stopping end 21, one end of the rod is for handling by hand, while the other end penetrates said ball 26 and through hole 171, and a support spring 24 is installed between the stopping ring 27 and the depressed chamber 22 to supply the rod with restoring force after being pushed down.

Figure 15:
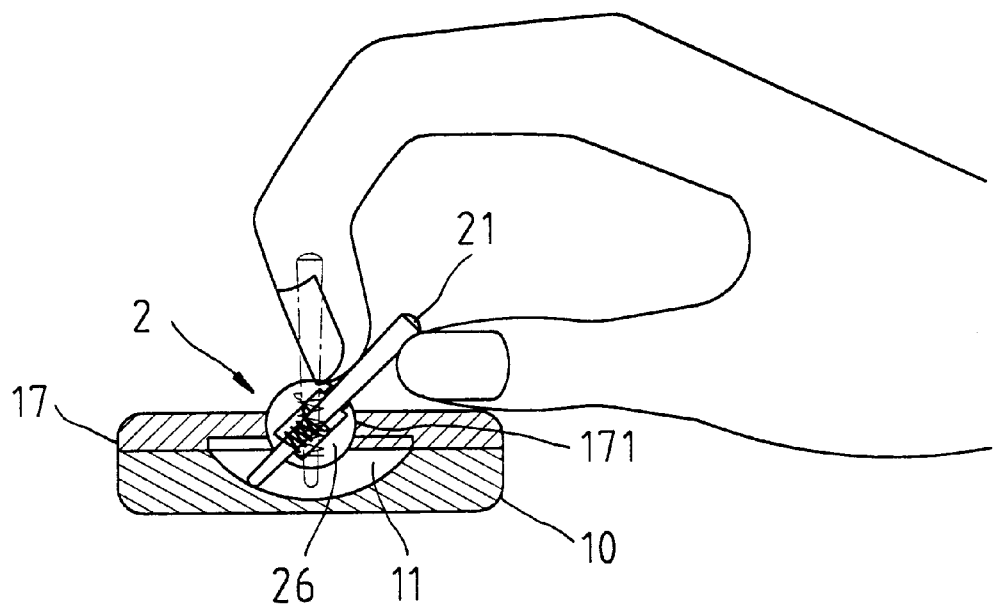
FIG. 15 is a cross sectional view showing the operation of the finger controlling input device in a fifth embodiment according to the present invention.
Figure 16A:
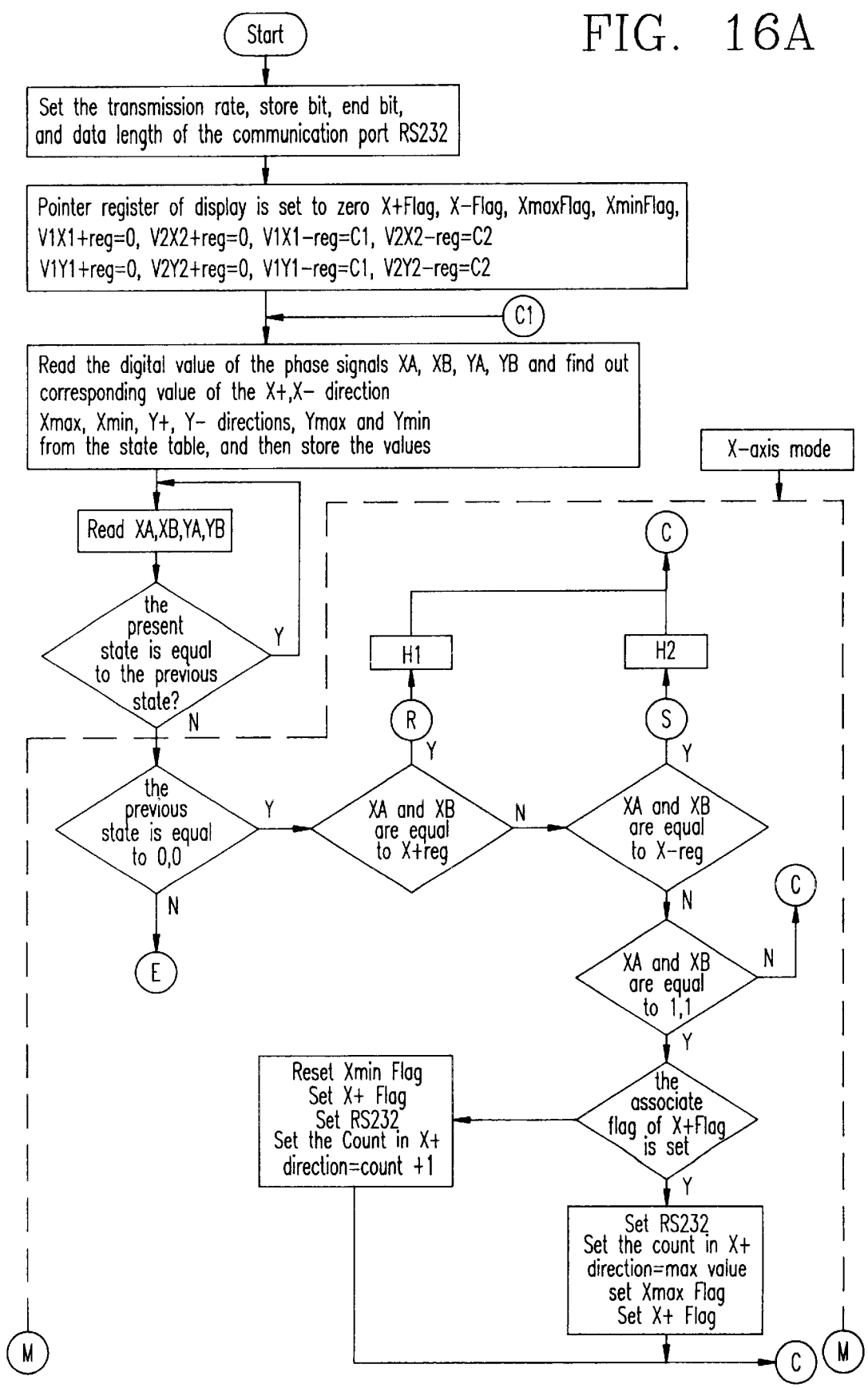
FIG. 16A to 16I are the flow charts of the programs of the formative positioning unit according to the present invention; and Table I≠III are descriptions of representations of blocks in the flow charts of FIG. 16A≠16I.
Figure 16B:
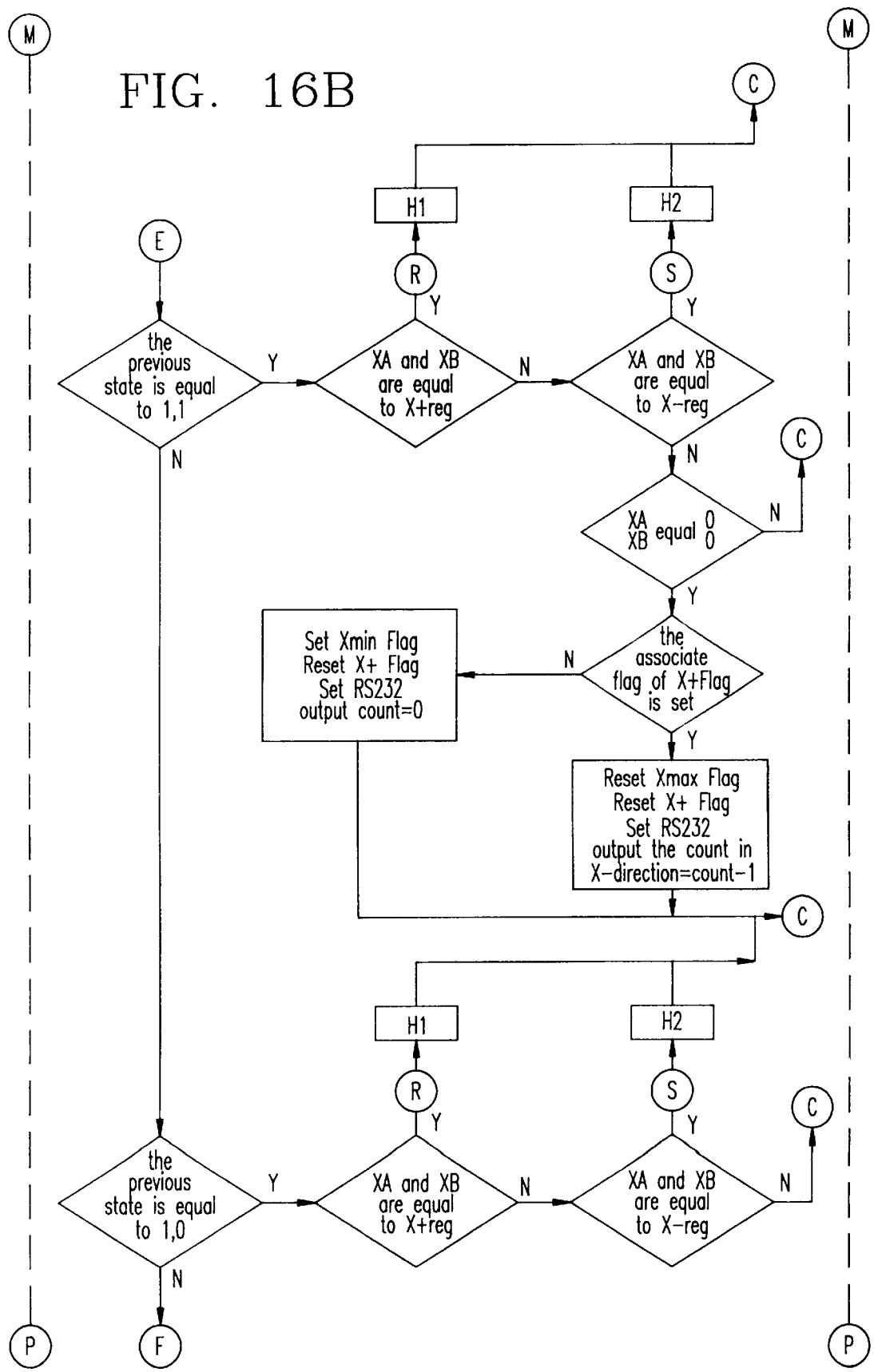
Figure 16C:
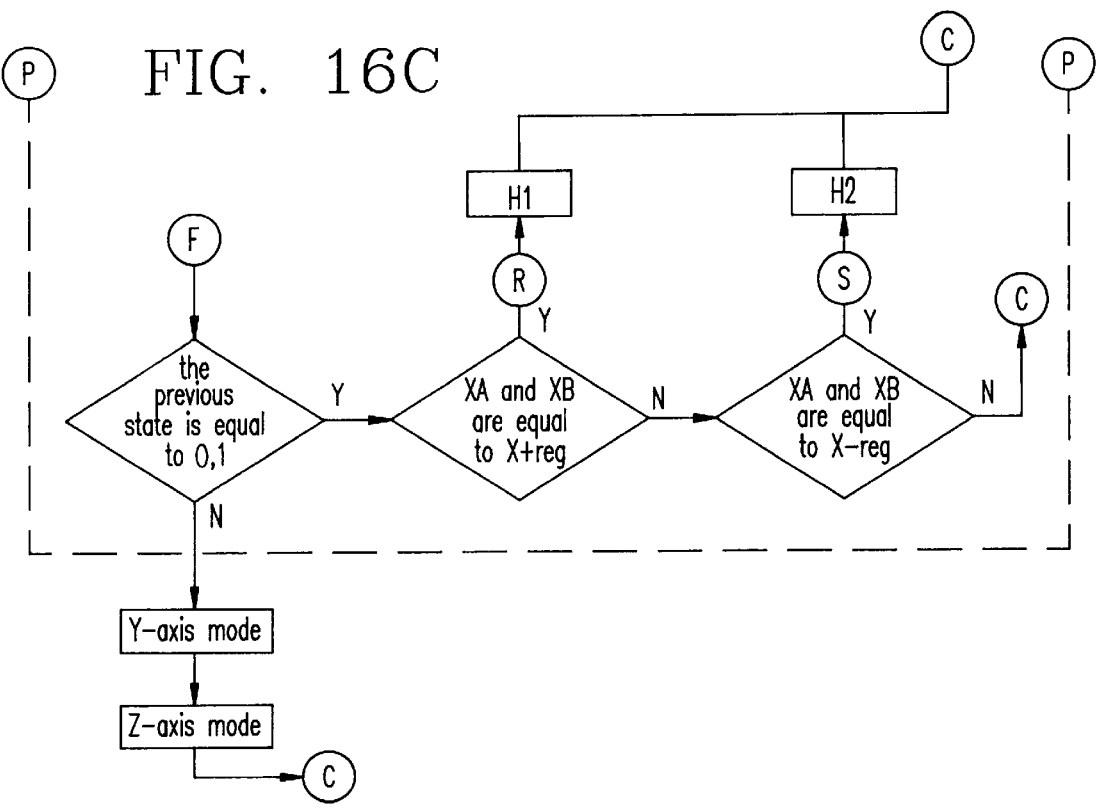
Figure 16F:
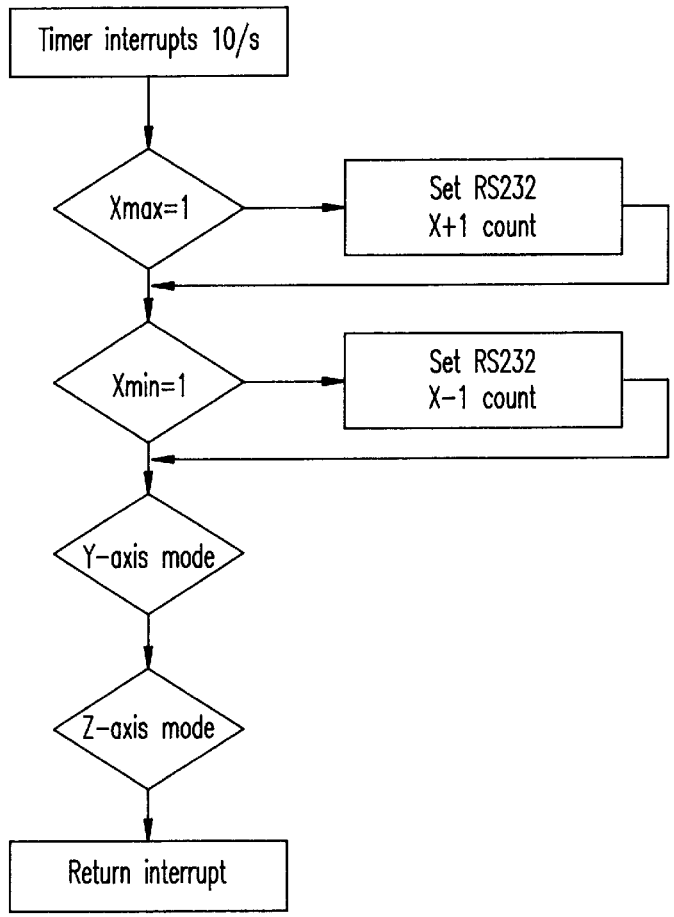
Figure 16D:
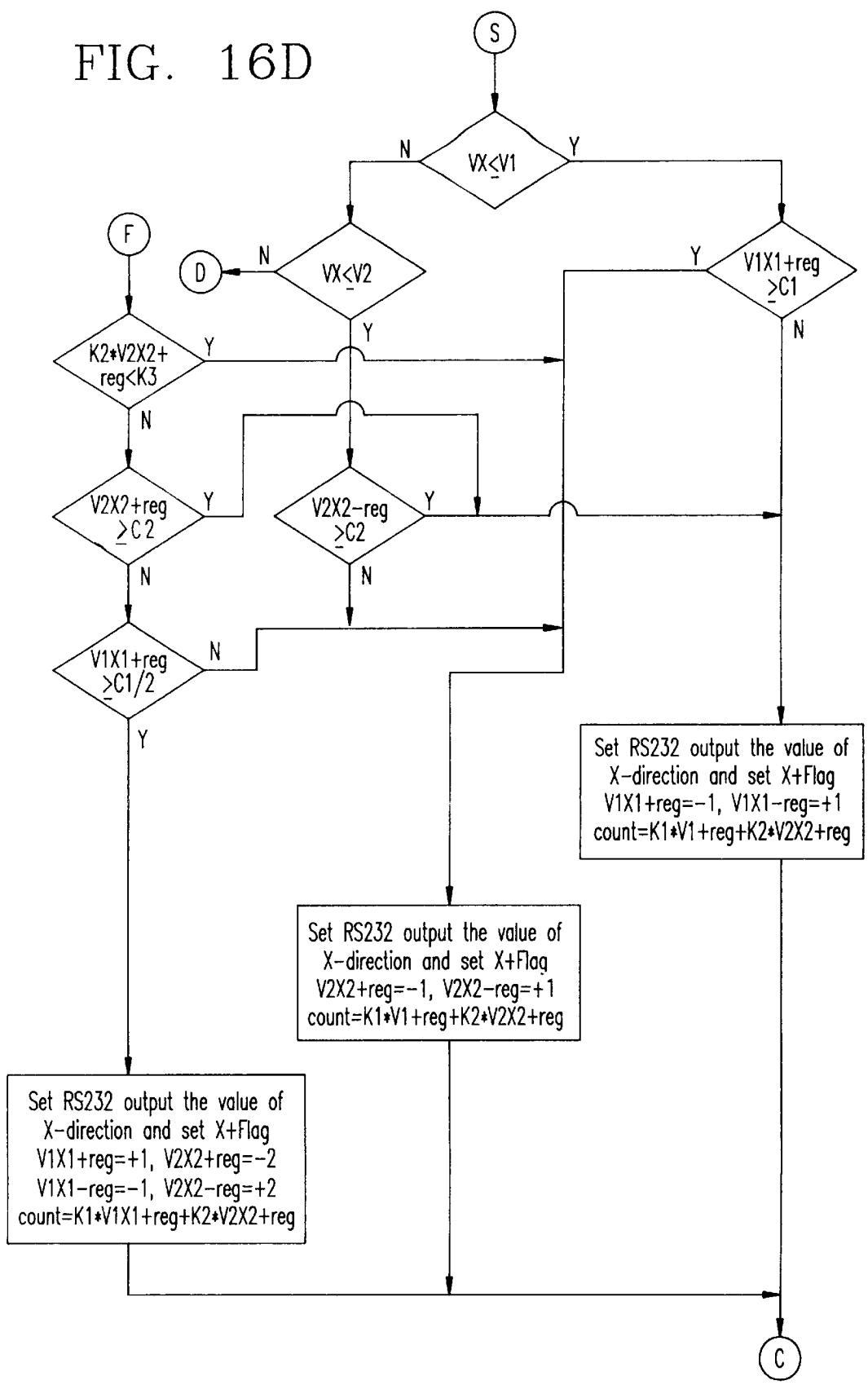
Figure 16E:
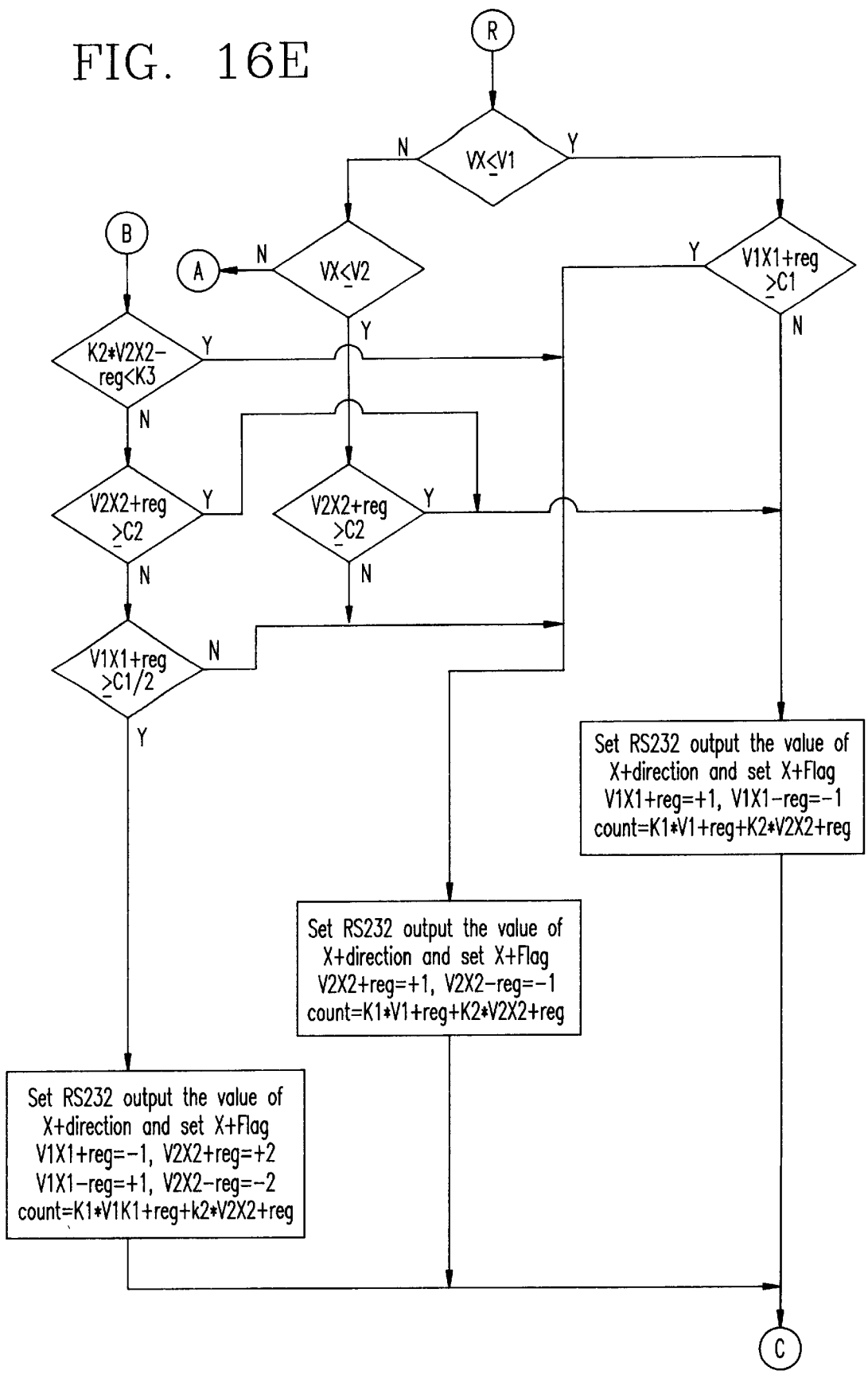
Figure 16G:
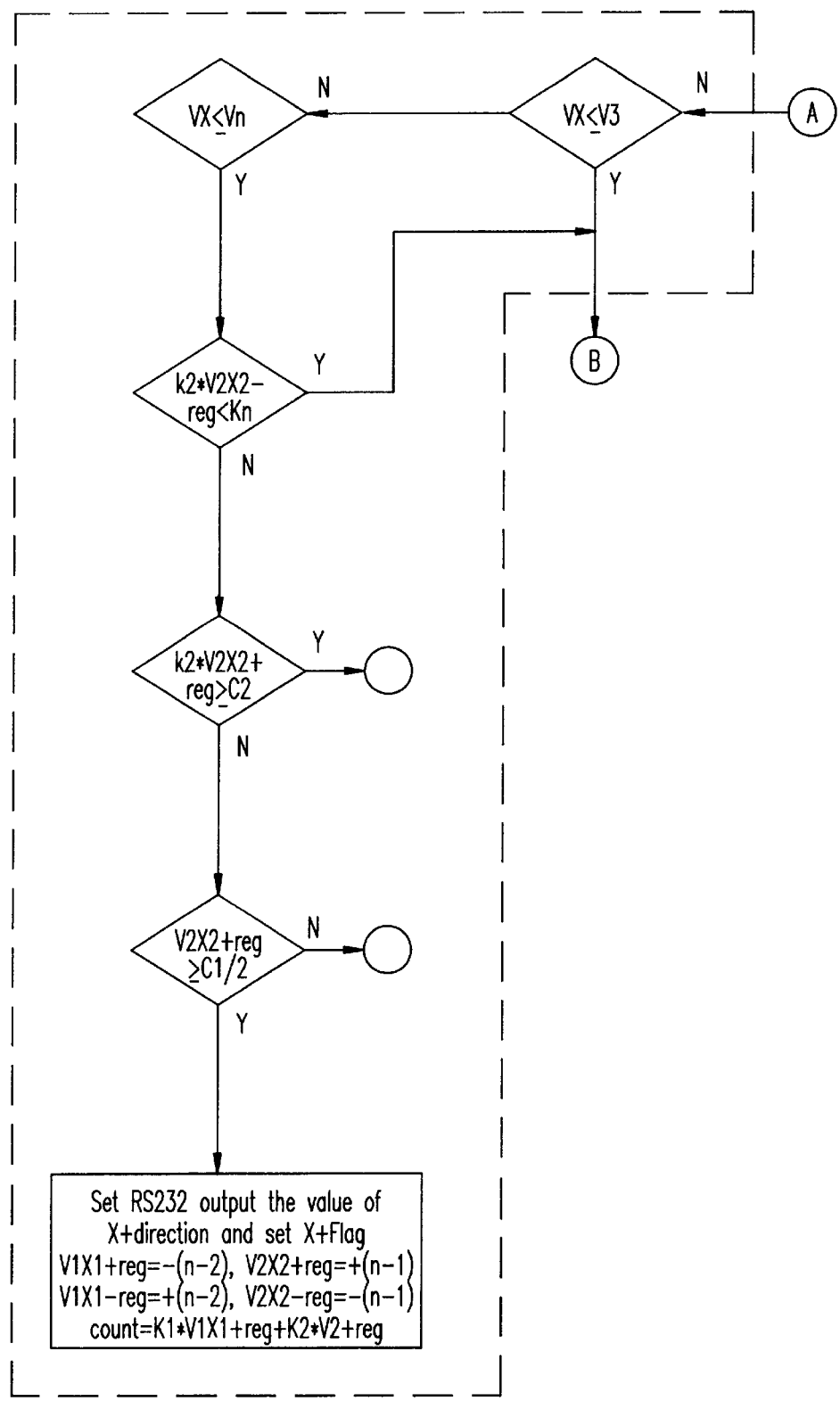
Figure 16H:
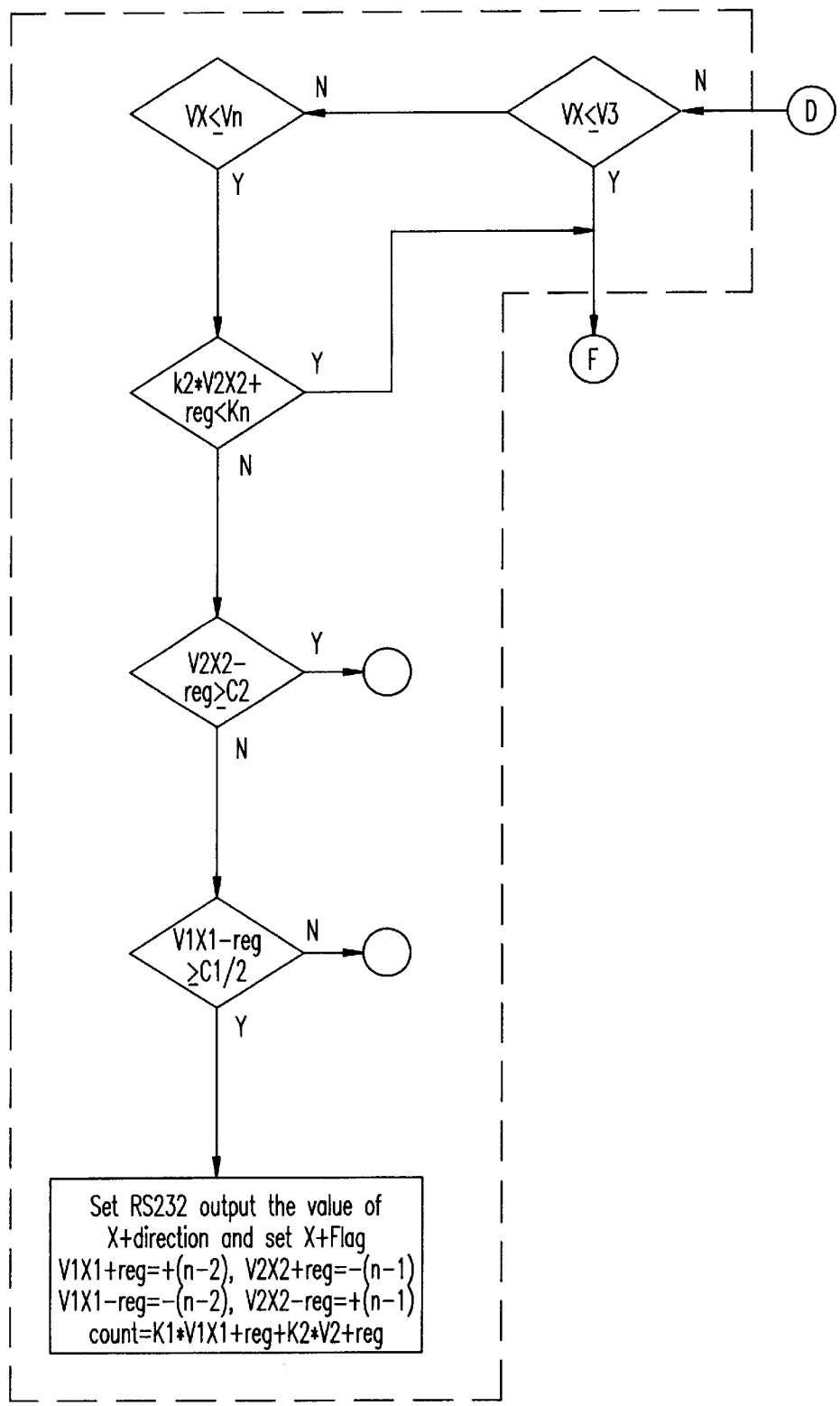
Figure 16I:
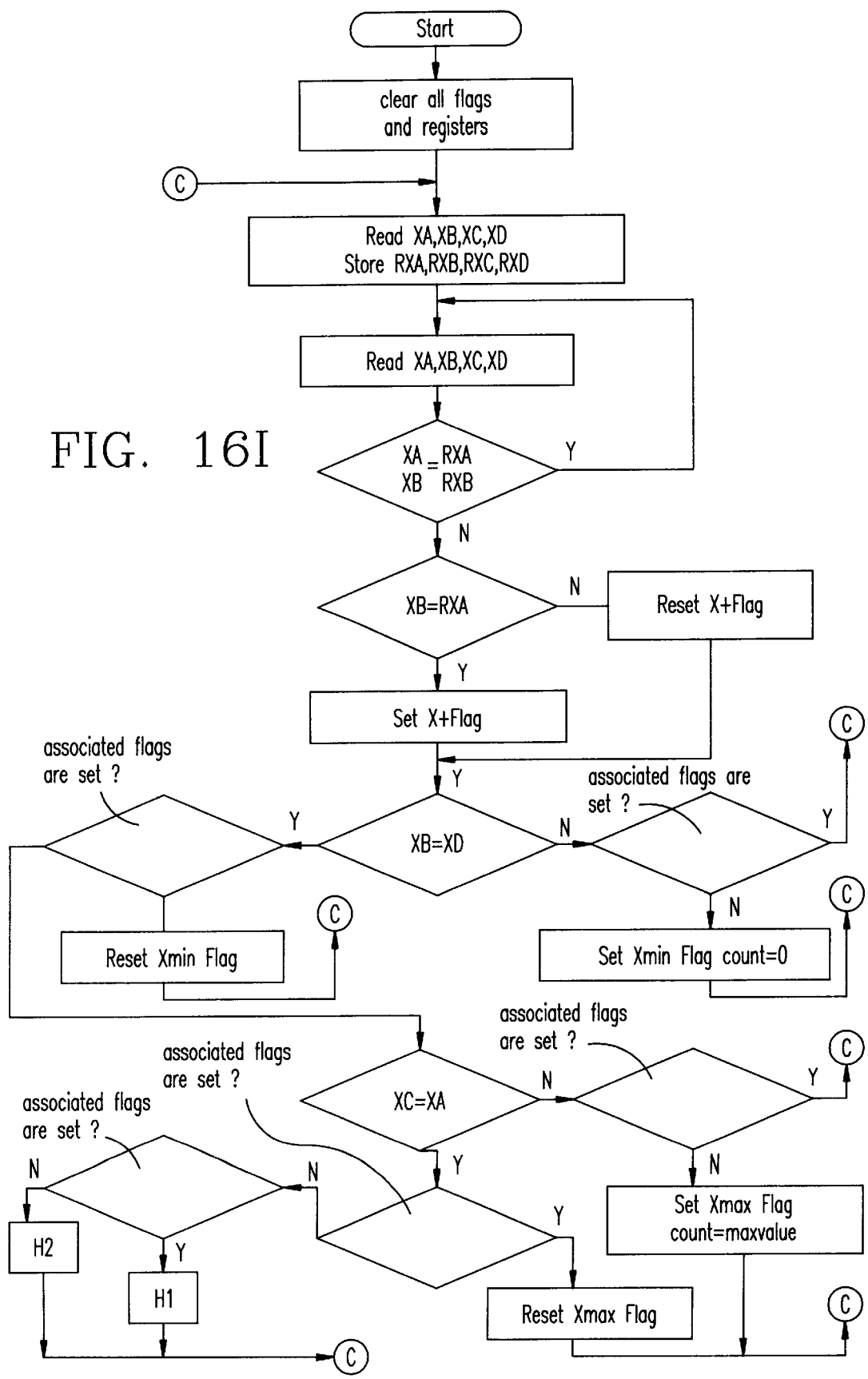

As shown in FIG. 15, when assembling, the user may push the exposed rod portion of the stopping end 21 by hand, and swing it with the ball 26 serving as a support so that the other end of the stopping end may touch the concave arc surface 11 on the touch input board 10. Similarly, by the function of formative positioning working unit 3, the pressed input medium 2 may swing within maximum region of circumference, enables the cursor to make stable and fine displacement corresponding to each point on the display, at any degree of resolution. Furthermore, the rod may serve as a rocking bar for game playing to perform dual function.

In conclusion, the technical means provided by the present invention obviously reduces the size of the finger controlling input device, and significantly reduces its production cost. In practical application, its size may be minimized to about 0.5 inch so that it may be sensibly operated by thumb. It can be conveniently disposed in key boards of various type, remote control devices or portable computers to perform stable displacement and precise positioning effects in absolute coordinate mode.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

TABLE I

|   | 1 | 2 | 3 | 4 |
|---|---|---|---|---|
| XA | 0 | 1 | 1 | 0 |
| XB | 0 | 0 | 1 | 1 |
| X + direction | | | | |
| XA | 1 | 1 | 0 | 0 |
| XB | 0 | 1 | 1 | 0 |
| X − direction | | | | |
| XA | 0 | 0 | 0 | 1 |
| XB | 1 | 0 | 0 | 1 |
| Xmax | 1 | | | |
|  | 1 | | | |
| Xmin | 0 | | | |
|  | 0 | | | |

Flag: Xman · Xmin · X+
Register: Xreg · X + reg · X − reg · Xmax reg · Xmin reg Ysreg · Xsreg Table II VX: the operating speed of the finger controllable element, and also provides a predetermined value as a reference value for speed determination. V(n) represents the different moving speed of the finger controllable element and the setting of speed level reference value.

C1: maximum displacement of the finger controllable element at minimum speed level.

C2: maximum displacement of the finger controllable element at second speed level.

C: maximum displacement of the finger controllable element, in which C1+C2=C.

K(n): various reference constants at different speed level and the mutual relationship of various speeds of the finger controllable element.

V(n)X(n): displacement of the finger controllable element at different speed level.

V1×1+reg a register for registering the displacement of the finger controllable element in positive direction at lowest speed level.

V2×2+reg: a register for registering the displacement of the finger controllable element in positive direction at the second speed level.

V1×1−reg: a register for registering the displacement of the finger controllable element in negative direction at lowest speed level.

V2×2−reg: a register for registering the displacement of the finger controllable element in negative direction at the second speed level.

Table III formula 1. $C1+C2=C$ formula 2. $Kn=(n-1)K2-(n-2)K1 \quad n \geqq 3, K2>K1$ formula 3. $(K1 \times C1)+((K2 \times C2))=$ display distance formula 4. $Kn \times VnXn = K2 \times V2X2 + K1 \times V1X1$ formula 5. $VnXn = V2X2 + V1X1$

What is claimed is:

1. A high resolution finger controlled input device movable over an arbitrarily defined range, comprising:

a finger controlled element having a plurality of thin layered sensing surfaces, which when closely scribed, can produce 0 and 1 binary signals representing a relative displacement of the input device; and a formative positioning unit, capable of producing 0 and 1 signals in any defined range divided by coordinate axes, wherein a total number of signals 0, 1 for each axis is divided into numbers of signals CN for each of a plurality of different speed regions, wherein C1 represents a number of signals in a low speed region and C2 . . . CN represent numbers of signals in higher speed regions, wherein each speed region corresponds to a different respective displacement multiple rate K1, K2 . . . KN, wherein a product of C1, C2 . . . CN with each respective corresponding displacement multiple rate K1, K2 . . . KN is summed to obtain a value at least equal to a corresponding display resolution, wherein at least two recorders are installed for each axis to record numbers CN above C1 and C2, the sum of the data in the at least two recorders being C, and wherein said position unit is further arranged to add 2 to the sum C2 . . . CN, and to subtract 1 from C1 in order to keep the sum of data in all of the recorders, and therefore increase the sum by 1 so that the total displacement is 1;

whereby a sensing surface of the finger controlled element is scribed to form an input range corresponding to an entire display resolution, which enables the finger controlling element to make low speed point-to-point fine displacement within said region, and when in high speed movement, to make an accelerated displacement and to enable return to the original point such that the cursor is able to be controlled effectively with respect to each point on the display.

2. A high resolution finger controlling input device movable over an arbitrarily defined range, comprising:

a touch input board arranged to detect movement of a finger;

a formative positioning unit arranged to produce 0 and 1 signals in any defined range divided by coordinate axes, wherein a total number of signals 0, 1 for each axis is divided into numbers of signals CN for each of a plurality of different speed regions, wherein C1 represents a number of signals in a low speed region and C2 . . . CN represent numbers of signals in higher speed regions, wherein each speed region corresponds to a different respective displacement multiple rate K1, K2 . . . KN, wherein a product of C1, C2 . . . CN with each respective corresponding displacement multiple rate K1, K2 . . . KN is summed to obtain a value at least equal to a corresponding display resolution, wherein at least two recorders are installed for each axis to record numbers CN above C1 and C2, the sum of the data in the at least two recorders being C, and wherein said position unit is further arranged to add 2 to the sum C2 . . . CN, and to subtract 1 from C1 in order to keep the sum of data in all of the recorders, and therefore increase the sum by 1 so that the total displacement is 1;

whereby a sensing surface of the touch input board is scribed to form an input range corresponding to an entire display resolution, which enables the finger controlling element to carry out a low speed point-to-point fine displacement within said region, and when in high speed movement, to carry out an accelerated displacement and to enable return to the original point such that the cursor is able to be controlled effectively with respect to each point on the display.

* * * * *